United States Patent [19]
Taylor et al.

[11] 3,997,866
[45] Dec. 14, 1976

[54] ACOUSTIC BUS PASSENGER COUNTER

[75] Inventors: William R. Taylor, Olney; Francis X. Linder, Landover, both of Md.; Robert V. Clark, Washington, D.C.

[73] Assignee: Automation Industries, Inc., Silver Spring, Md.

[22] Filed: Mar. 31, 1975

[21] Appl. No.: 563,871

[52] U.S. Cl. .............................. 340/1 R; 340/1 C; 340/3 FM; 340/3 D
[51] Int. Cl.² ........................................ G01S 9/66
[58] Field of Search ........... 340/1 R, 1 C, 1 T, 3 D, 340/3 FM, 38 S, 39, 51

[56] References Cited
UNITED STATES PATENTS

| | | | |
|---|---|---|---|
| 3,097,295 | 7/1963 | Williams | 340/38 S |
| 3,109,157 | 10/1963 | Bolton | 340/51 |
| 3,172,075 | 3/1965 | Kay | 340/1 R |
| 3,321,737 | 5/1967 | Russell | 340/1 R |
| 3,742,434 | 6/1973 | Leyde et al. | 340/1 R |

Primary Examiner—Richard A. Farley
Attorney, Agent, or Firm—Jones, Tullar & Cooper

[57] ABSTRACT

A system for detecting and counting entry and exit of passengers. Transmitted high frequency sound beams define at least two zones through which passengers pass in sequence when entering or leaving a vehicle; the motion of a passenger through the zones produces signals at a receiver which are fed to logic circuits to produce appropriate counts. The logic circuits discriminate between moving human targets and other moving objects within the zones, and include range discrimination to prevent interference from outside the detection area. In one embodiment the sensor is located above the entry area to detect passengers' heads, while another embodiment is located at a level to detect passenger foot motion.

11 Claims, 6 Drawing Figures

TIMING FOR ENTERING PASS.

ACOUSTIC BUS PASSENGER COUNTER

BACKGROUND OF THE INVENTION

The present invention relates, in general, to a passenger detection system for vehicles such as buses, and more particularly to an acoustic system for detecting ingress and egress of passengers whereby an accurate running count of the number of passengers entering and leaving the vehicle can be maintained.

Numerous methods for counting passengers and for automatically keeping a track of the number of passengers on board a passenger vehicle such as a bus have been devised over the years, but for a variety of reasons none have been entirely satisfactory. Turnstiles at the entry and exit doors are unacceptable primarily because of the congestion they produce when there is a large number of passengers or when passengers are carrying parcels. The use of tickets to keep track of passengers has been proposed, but this procedure is time consuming and confusing, and this is unsatisfactory. Seat switches are inaccurate, for they record heavy packages as passengers and cannot count standees, while treadle counters provide inaccurate readings when anomalous traffic situations occur, or when two passengers are on the same step. Photoelectric counters of the beam-breaking variety have been tried, but the beams cannot discriminate between passengers and packages, and cannot distinguish two-way traffic. Moreover, a passenger standing on a step and swaying with the motion of the vehicle could cause multiple readings in a photoelectric device.

Thus, there is a need for a system that can reliably and accurately count passengers, can discriminate between those entering and exiting, is insensitive to packages or carried articles such as canes and umbrellas, and which overcomes the various problems encountered with prior art systems. In accordance with the present invention, these prior art difficulties are best overcome by techniques that sense motion through a volume of space that is bounded in three dimensions. It has been found that a range-filtered pulse-doppler sonar system can be designed to ignore all targets except those moving through a particular volume of space in a particular direction and that such a system can provide an economical and effective solution.

SUMMARY OF THE INVENTION

It is, therefore, an object of the present invention to provide an acoustic system for detecting the ingress and egress of passengers, and to provide means for accurately and reliably counting the passengers to provide an indication of the number of passengers entering and leaving a vehicle such as a bus or train.

In accordance with the invention, acuoustic transmitters and sensors are located near the entrance and exit doors of a vehicle to monitor the movement of entering and exiting passengers. The transmitter is designed to emit pulses of acousitic energy at sonic or ultrasonic frequencies, with the emitted sound waves being reflected and returned to a suitable acoustic receiver. The received sounds are fed through frequency and range discriminating circuits to a logic network which provides a plus signal to indicate a passenger boarding the vehicle and a minus signal to indicate a passenger leaving the vehicle. With a system of this type, however it is important to locate the sensor transducers so that no passenger blocks the system's view of another. Two possible locations satisfy this criterion: overhead and underfoot. The latter arrangement is vulnerable to malfunction caused by the accumulation of water, snow, ice, mud, sand, etc. on the vehicle stairway or aisle, and thus is unsatisfactory. Although this difficulty can be overcome by placing the sensor transducers on the stairway risers instead of directly underfoot, it is evident that an overhead location is a less severe environment.

An overhead sensor should detect only the passenger's head, while a riser-mounted sensor should detect only his feet and ankles. These requirements create quite different problems of detection, however, since foot motion varies within much narrower limits than head motion when a person climbs or descends stairs. Further, an overhead sensor must respond to differences in passenger heights which may be on the order of 40 inches, while there is only a few inches difference in the trajectory of a child's foot and that of a large adult in climbing or descending stairs, and both sensors must be capable of accomodating two people on the same step, going in the same or opposite directions.

In stair climbing, the head alternates between horizontal and upward diagonal motion as an individual shifts weight from the leg on the lower step to the leg on the next higher step. The waveform of this motion is quite consistent, but its phase is not; that is, the termination of each horizontal and diagonal segment of motion will vary widely with respect to the coordinate system defined by the stair risers. This variation will depend, among other things, on the speed, burden and habit of the individual, and particularly will be affected by the presence of other passengers climbing or attempting to climb the stairs. Similar trajectories are encountered when an individual descends the stairs, except there usually is some bounce as the knee flexes to absorb shock when the lower foot reaches the next step, and higher speeds and accelerations are usually involved.

Both the upper and lower sensor locations are exposed to anomalous traffic and parcel problems, but with some differences. The step rise sensor is not often exposed to parcels in the usual sense, but some way must be provided to insure that the sensor does not equate two passengers carrying canes or umbrellas with three passengers not doing so. In accordance with the present system this is accomplished by means of system logic, for it has been found that a wooden cane one inch in diameter returns acoustic waves with 6 to 16 db more energy than a person's foot, depending on the orientation of the foot, while a folded umbrella is comparable to a foot in its return. Similarly a head counter must not record a passenger's head, shoulders and shopping bag as three different people, but here again the distinction must be made in the logic circuit instead of relying on returned signal strength.

Both the overhead and the stair riser systems utilize a pair of transducers, one transmitting acoustic signals and the other receiving reflected signals. The received signals are fed to three parallel zone filters which are active bandpass filters that restrict the response of their respective channels to signals reflected from specific predetermined range zones. The three zoned signals then are fed through corresponding differential discriminators which produce outputs proportional to the rate of change of received signal frequency within their corresponding range zones, with the polarity of the output indicating direction. A moving object within a given range zone thus produces an output whose amplitude is proportional to the speed of the object and whose polarity depends on whether range is increasing or decreasing. The outputs of the differential discriminators are then fed to suitable logic circuitry to detect motion through the three range zones, and to produce output signals indicative of passenger movement. In this manner the ingress and egress of passengers is reliably and accurately detected.

BRIEF DESCRIPTION OF DRAWINGS

The foregoing and additional objects, features and advantages of the present invention will be more fully appreciated when considered in the light of the following detailed description of a preferred embodiment thereof, selected for purposes of illustration and shown in the accompanying drawings, in which.

DESCRIPTION OF PREFERRED EMBODIMENTS

Figure 1:
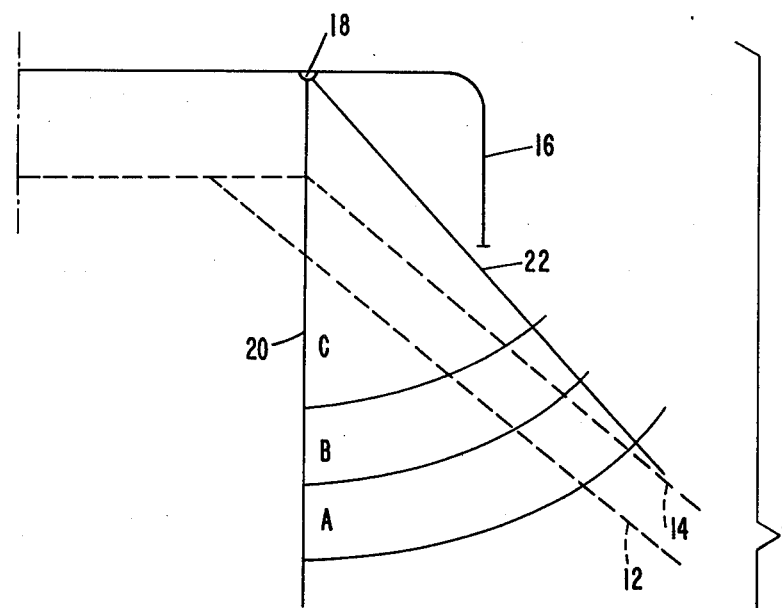
FIG. 1 is a diagrammatic illustration of the location of range zones for an overhead detector system.

Turning now to a more detailed consideration of the present invention, FIG. 1 illustrates at 10 the locus of a stairway leading to a vehicle such as a bus, train, or the like which passengers may enter or leave. The dashed lines 12 and 14 indicate the locus, or limits of head movements of a typical passenger as he climbs or descends the stairs. Although the head motion will vary considerably, it generally will always fall within the limits of defined by lines 12 and 14, and at some point in its motion will move from the location of line 12 to the location of line 14.

Mounted on the ceiling 16 of the vehicle above the stairway is a detector 18, which may be a pair of acoustic transducers, having a detection field lying between lines 20 and 22. By means of suitable zone filters to be described, the detection field, or field of vision, of the transducers 18 is divided into three range zones A, B and C, so that as a passenger enters the vehicle, his head passes through zones A, B and C sequentially, while on leaving the vehicle his head passes through zones C, B and A in sequence.

Figure 2:
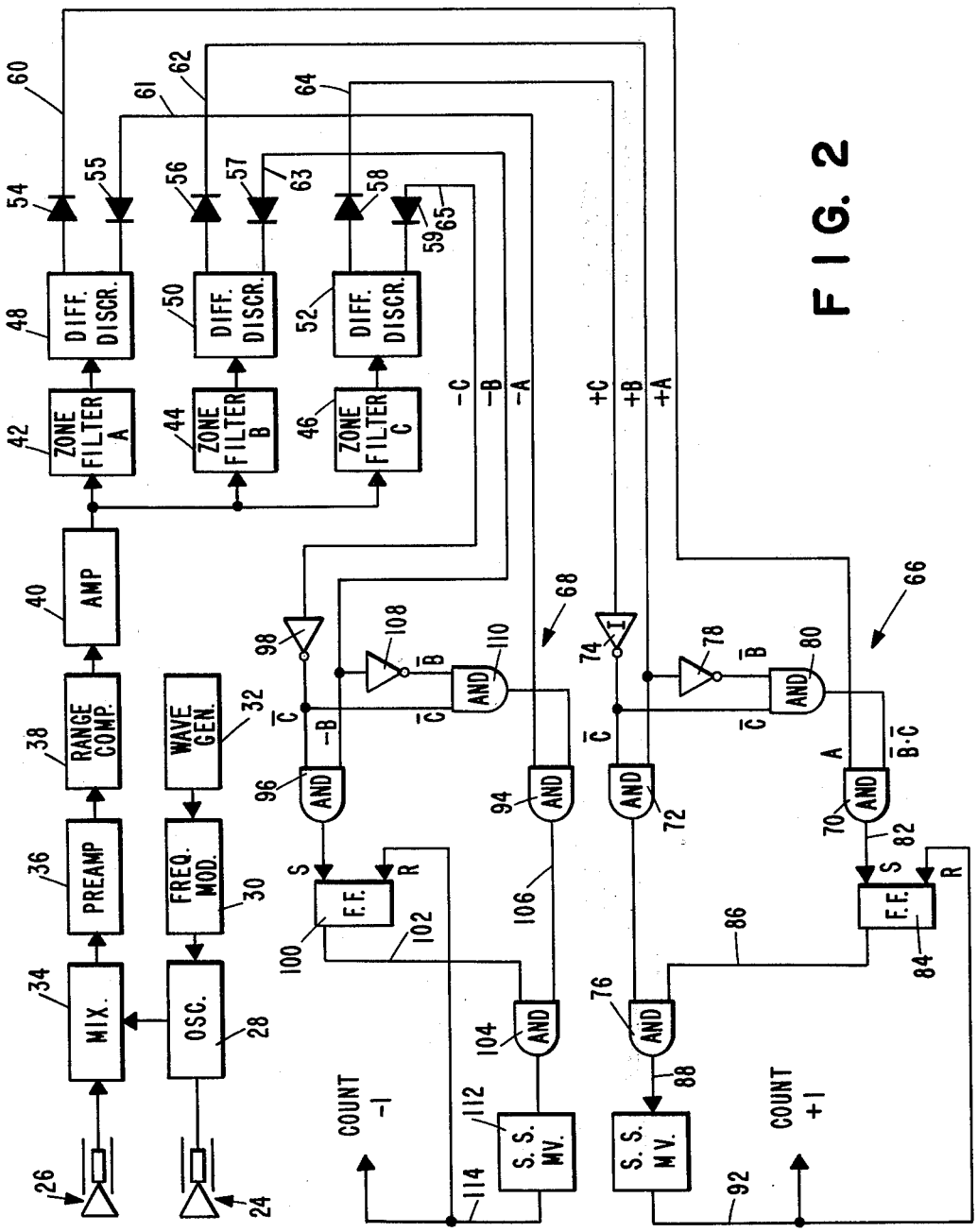
FIG. 2 is a block diagram of an overhead detector system.

As illustrated in FIG. 2, the detector 18 comprises a pair of conventional acoustic transducers 24 and 26, such as the Massa TR89, the first serving as a transmitter and the second serving as a receiver of acoustic signals. The transmitting transducer 24 is driven by an oscillator 28 operating at a selected ultrasonic carrier frequency fo, with its output being frequency modulated by means of modulator 30 in accordance with a triangular waveform fm generated y low-frequency wave generator 32. The bandwidth of the transmitter is about 2 kHz, which is also the peak deviation of the frequency modulation.

The triangular wave of the generator 32 may, in one embodiment of the invention, be an NE566V function generator chip operating at a 60 Hz rate. The output of this generator drives a 2N2222A transistor which serves as the frequency modulator 30 and modulates a second NE566V function generator oscillating at 23 kHz. The output of this second NE566V generator drives the transducer 24 through a suitable impedance matching network.

The energy transmitted by transducer 24 is reflected from nearby objects and returned to the receiver transducer 26, where the returned signals are combined in a mixer 34 with the signal being transmitted at the instant of return. If the target range is R and the velocity of propogation of sound is C, it requires a measurable time 2R/C for a transmitted signal to travel to the target and return. Since the transmitter frequency is continuously changing as a result of the frequency modulation of oscillator 28, the returned signal will be at a different frequency from that of the transmitter at the instant the return signal is received. The output of the mixer 34 will be the difference between these frequencies, and will contain two components of frequency. In a monostatic homodyne target sensor utilizing linear (i.e., sawtooth or triangular) frequency modulation, wherein the modulating function $f(t)$ is a linear function of time during the modulating cycle, the components of the mixer output may be obtained as follows.

The transmitted signal is $e_T = \cos 2\pi (f_o + f(f))t$, where $f_o$ is the carrier frequency. The signal returned to the receiver from the target is delayed in time by $2R/C$, where R is target range and C the velocity of propagation in the medium. The frequency of the received signal is also subjected to a Doppler shift $(C-V)/(C+V)$ in the event of a target radial motion component V. When $V<<C$, this is very closely $1 - 2V/C$. Thus the received signal is:

$$e_{REC} = \cos 2\pi (1 - 2V/C)(t - 2R/C)(f_o + f(t)),$$

neglecting path loss.

This is demodulated using the transmitted signal as a local oscillator and selecting the lower sideband resulting from the multiplication process:

$$e_{SIG} = LSB(e_T \times e_{REC})$$

$$= \cos 2\pi (f_o + f(t))t - (1 - 2V/C)(t - 2R/C)(f_o + f(t))$$

$$= \cos 2\pi (f_o + f(t))(2Vt/C + 2R/C - 4VR/C^2).$$

let $f(t) = Dt/T$, where D is the peak frequency deviation and T is the period of the modulation cycle (half the period in the case of a triangular wave). Then $$e_{SIG} = \cos 2\pi(f_o + Dt/T)(2Vt/C + 2R/C - 4VR/C^2)$$

$$= \cos 2\pi[(2VD/CT)t^2 + (2Vf_o/C + 2DR/CT - 4VRD/C^2T)t + (2R/C - 4VR/C^2)f_o]$$

Since $t$ is always much less than C, the first term is negligible, and the frequency content of this expression is the coefficient of $t$. (The coefficient of $f_o$ is a phase term.)

$$\text{freq}(e_{sig}) = (2R/C - 4VR/C^2)(D/T) + Vf_o/C.$$

The first term is proportional to the range of the target. The second takes account of the fact that the range of a moving target changes during the course of a frequency sweep. The third term is the Doppler shift caused by radial target motion. The factor D/T is the rate of change of frequency for a sawtooth wave, and may be replaced by $df/dt$ for other waveforms. Since the range change during a single modulation cycle is generally small, the second term is ordinarily neglected. If this is done and a modulation frequency $f_M$ is defined as $1/T$, $$freq = 2Df_M R/C + 2Vf_o/C.$$

The ratio of "range frequency" to Doppler shift is $$(Df_M/f_o)(R/V).$$

Thus it will be seen that the two components of the mixer output are $2Df_M R/C$ and $2Vf_o/C$ for a triangular modulation wave, where V is the radial velocity of the target. The first component, which is directly proportional to target range, may be referred to as the range frequency, while the second is the doppler shift of the carrier frequency. By judicious choice of the various frequencies $f_o$, $f_M$ and D, the range and doppler frequencies for a particular target class can be widely separated in frequency, and the doppler frequencies can then be suppressed by suitable filtering to prevent target motion from generating spurious range frequencies.

The output of mixer 34 is fed to a preamplifier 36 and then to a range compensator 38. The compensator is a pre-emphasis filter having a transfer characteristic rising with frequency at a rate of 12 db per octave. This filter has three useful effects. First, by the inverse fourth power low of a monostatic system, the energy return from a target declines 12 db each time the range of the target is doubled. Since the range frequency is proportional to range, an audio response rising at this rate insures that targets at different ranges provide the same energy to the logic circuity following the compensator filter. Second, the modulation parameters are chosen so that the range frequency is always much higher than the doppler frequency, and the rising characteristic therefore tends to suppress the doppler component. Finally, the range compensation modifies the apparent shape of the polar response pattern of the transducer so that it has a desirable conical form. That is, if a target is detectable at some range $R_o$ at a given boresight angle of the transducer, the target will also be detectable at any other range along that angle because a change in signal strength due to a change in range is compensated by an inverse change of sensitivity in the compensator circuit 38. If, however, the target moves boresight angle at a constant radius, or range, the variation in return signal strength due to the inherent sensitivity pattern of the transducer is not compensated. This results in a sharply defined conical beam pattern.

The output from compensator 38 is fed to an amplifier 40, and thence to three parallel zone filters 42, 44 and 46. These are conventional active audio bandpass filters which restrict the response of their respective channels to specified frequencies, thereby limiting the range of each channel to distances lying between definite limits. Thus, filter 42 defines channel A and limits this channel to frequencies corresponding to the ranges illustrated in FIG. 1 as defining zone A. Similarly, filter 44 limits channel B to frequencies corresponding to the ranges illustrated as defining zone B, and filter 46 limits channel C to frequencies corresponding to zone C.

The three zoned signals are fed from the filters 42, 44 and 46 in channel A, B and C to corresponding differential discriminators 48, 50 and 52, respectively, each of which produces an output which is proportional to the rate of change of frequency of returned signals within its zone limits. Thus a stationary object in anyone of the zones produces no output from its corresponding differential discriminator, while an object whose range is changing produces an output whose amplitude is proportional to speed and whose polarity depends on whether range is increasing or decreasing. Approaching and receding objects are separated by polarity by means of the diodes 54 - 59 at the outputs of the discriminators. Six conditions are recognized in this system. A signal on line 60 at the output of diode 54, for example, represents a passenger in zone A entering a vehicle, while a signal on line 61 at the output of diode 55 represents a passenger leaving the vehicle through zone A. Passengers entering the vehicle through zones B or C produce signals on lines 62 and 64, respectively, while passengers leaving through zones B or C produce signals on lines 63 or 65.

To provide an unambiguous output signal indicating whether a passenger has entered or left the vehicle, and to prevent spurious indications, the outputs from discriminators 48, 50 and 52 are fed to a logic circuit which processes the signals in such a way that only selected zone signals ocurring at selected times with respect to other zone signals will produce passenger indicators. The logic circuit is so constructed that the presence of a signal pulse of a given polarity in zone C inhibits recognition of simultaneous signals of the same polarity in zones A or B. Similarly, a signal in B inhibits recognition of simultaneous signals of the same polarity in A. When a boarding passenger climbs a step, his head, shoulders and parcels will generally move upward simultaneously, producing simultaneous signals of the same polarity in all three zones. However, the C-B-A inhibition permits the system to recognize only the nearest of the targets, which normally will be the passenger's head. Although the movement of the passenger's legs will not be synchronous with head movement, these non-simultaneous signals will be rejected by the far range boundaries of the zones. Two passengers traversing a range zone at the same time, whether in the same or opposite directions, will not be perfectly synchronized, and therefore the presence of one will not prevent recognition of the other.

Traverse of the B zone in the minus, or exit direction produces a −B signal which is used in the logic circuit to enable a subsequent signal produced by a traverse of the A zone in the exit direction to trigger a one-shot multivibrator to produce an indicator signal which scores one departed passenger (count −1). Similarly, traverse of the A zone in the plus, or entry, direction enables recognition of a subsequent traverse of the B zone in the same direction as a boarding passenger.

The C zone has no counting function. Its purpose is to restrict the system response to the topmost part of an entering or departing passenger and thus to inhibit false counts of parcels or extraneous body movements. Once passengers have reached, or have not yet departed from, the main floor of the bus or other vehicle, their head movements are primarily tangential to the detector, rather than being in a radial direction, so passengers standing, or swaying with the movement of the vehicle, within range of the detector will have no effect on the detecting system, and will not interfere with the detection of events on the entry and exit stairways. Beat frequency phenomena from multiple objects in this area will be of high frequency compared to the desired signals and will be filtered out by the time constant of the discriminator prior to differentiation.

The outputs of each of the differential discriminators may be fed through threshold circuits and one-shot multivibrators, if desired, to provide pulses of constant width and amplitude to the logic circuit. The logic circuit for the overhead counter of FIG. 2, however, includes an entry counter network generally indicated at 66 and an exit counter network generally indicated at 68. The entry counter receives the plus signals A, B and C carried by lines 60, 62 and 64 from the discriminators, while the exit counter receives the minus signals appearing on lines 61, 63 and 65, and each counter processes the received signals in accordance with their sequence to produce the required count signal output.

The +A signal on line 60 is applied to one input of a first AND gate 70, the +B signal is applied to one input of a second AND gate 72, and the +C signal is applied through an inverter 74 to a second input of gate 72. The presence of signals at both inputs to gate 76 produces an output on line 88 which activates a single-shot multivibrator 90 to produce a count pulse on line 92. This count pulse indicates an entering passenger, and is also used to reset flip-flop 84 to prepare the system for the next count.

In operation, an entering passenger passes through zones A, B and C in sequence, thereby producing positive-going pulses on lines 60, 62 and 64 in sequence. The +A signal is applied to AND gate 70, and in the absence of B or C signals, this gate provides an output, setting flip-flop 84. Upon occurrence of a +B signal, AND gate 80 is enabled by way of inverter 78. The +B signal is applied to AND gate 72 and in the absence of a C signal, gate 72 produces an output which is fed to gate 76 to activate that gate and produce a count. The subsequent +C signal is inverted by inverter 74 and the resulting $\overline{C}$ inhibits gate 72 and at the same time causes gate 80 to produce an output which inhibits gate 70.

The exit counter network 68 includes a first AND gate 94 which receives the −A signal from line 61, a second AND gate 96 which receives the −B signal from line 63, and an inverter 98 which receives the −C signal from line 65. The inverted output of $\overline{C}$ of inverter 98 is applied to the second input of AND gate 96, the output of which is fed to the set terminal of a flip-flop 100. When set, the flip-flop produces an output signal on line 102 which is applied to one input of a third AND gate 104. The second input to gate 104 is supplied by way of line 106 from the output of gate 94.

The −B signal on line 63 is also applied by way of an inverter 108 to one input of a fourth AND gate 110, the other input receiving the $\overline{C}$ output from inverter 98. The two signals $\overline{B}$ and $\overline{C}$ produce an output from AND gate 110 which is applied to the second input of AND gate 94. Outputs from gate 94 on line 106 and from flip-flop 100 on line 102 are applied to AND gate 104, the output of which is applied to a single shot multivibrator 112 which, when energized, produces a count pulse on line 114. The pulse on this line is also used to reset flip-flop 100.

The operation of the exit logic circuitry 68 is similar to that of the entry logic, with the sequence of signals required to produce a count pulse being changed. A passenger leaving the vehicle normally will first enter the C zone, and then will move away from the detector into the B and finally the A zones. The existence of a −C signal with no other signals present will produce no count. As The passenger moves from zone C to zone B, gate 96 is activated to set flip-flop 100, producing an output on line 102. When the passenger moves from zone B to zone A, the −A signal on one input of gate 94 and the output from gate 110, caused by the absence of the −B and −C signals, on the other input of gate 94 activate gate 94 and provide the second input to gate 104, thereby producing an exit count.

The mixer 34 and preamplifier shown in block diagram form in the receiver portion of the system thus far described may be reversed if desired, with a two-stage preamplifier employing MC1401C quad op-amp chip preceding a diode detector with RC bypass which serves as the mixer. The range compensating filter 38 may be a four element RC filter, and each of the zone filters 42, 44 and 46 may comprise four stages of active RC filtering. Each stage of the zone filter preferably has a Q of 10 and a slope of 12 db per octave relative to the filter bandwidth, with all four stages being provided by a single MC3401P chip,. another MC3401P chip may be used to provide both the A and B zone discriminators 48 and 50, which are resistance-tuned Crosby-type demodulators. The C zone discriminator 52 is similar, except that differential detection of high and low pass filters is employed because of the greater bandwidth requirement of this filter.

Figure 3:
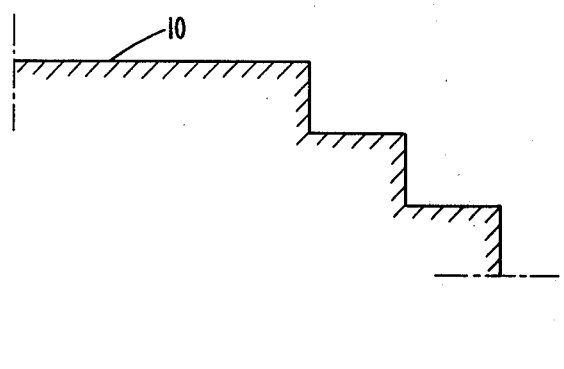
FIG. 3 is a diagrammatic illustration of the location of range zones for a foot detector system.
Figure 3:
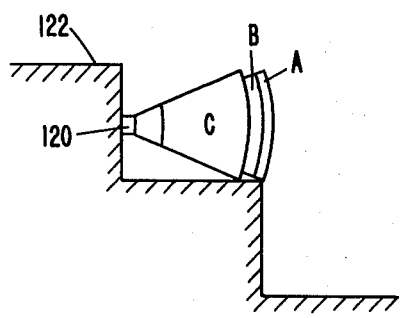

The problems encountered in a detector system which senses the motion of a passenger's feet are somewhat different than those encountered in the above described overhead system, and accordingly some differences in the logic arrangement are provided. As illustrated in FIG. 3, the area of foot motion on a stairway is limited, and thus the range zones through which the foot passes in entering or leaving the vehicle are also limited. In this Figure, a transducer 120 is mounted on the riser of one of a set of stairs 122 over which passengers entering or leaving the vehicle must traverse. The transducer incorporates a transmitter and receiver in the manner of the FIGS. 1 and 2 embodiment, with the receiver incorporating circuitry for defining three zones A, B and C. In this case, zones A and B are very thin, with zone B being situtated just inside and concentric with zone A. Zone C is not thin, but encompasses the area from the inner edge of zone B to the transducer, or as near to the transducer as the acoustics will allow. Each zone slightly overlaps its adjacent zone or zones.

A passenger entering the vehicle will, in placing his foot on the step, first pass through zone A, then the overlapping area A·B, then zone B, overlapping area B·C, and finally will come to rest in C. A passenger exiting the vehicle, on the other hand, will first intercept zone C as he moves his foot down onto the step, and then will pass out through zones B and A in that order. Accordingly, the sequence in which the foot passes through zones A and B differentiates between exiting and entering passengers.

A passenger may pass through zones A and B twice when entering or leaving the vehicle, such as by placing both the feet on the step carrying the detector system, or he may be carrying a can or an umbrella that he places on that step. Similarly, his second foot may intercept zones A and B while in transit from the preceding step to the next suceeding step. To prevent such events from providing double counts, the logic network in this embodiment utilizes zone C to block the outputs corresponding to zones A and B as long as a foot or other object rests on the step. Thus, when entering, the first object to approach the step is counted, and further up counts are blocked until the last foot or object leaves zone C. An exiting passenger, on the other hand, enters zone C first and block all down counts until the last foot or object leaves the step, and the count is then made at the end as the foot passes out through B, B·A, and A in sequence.

Figure 4:
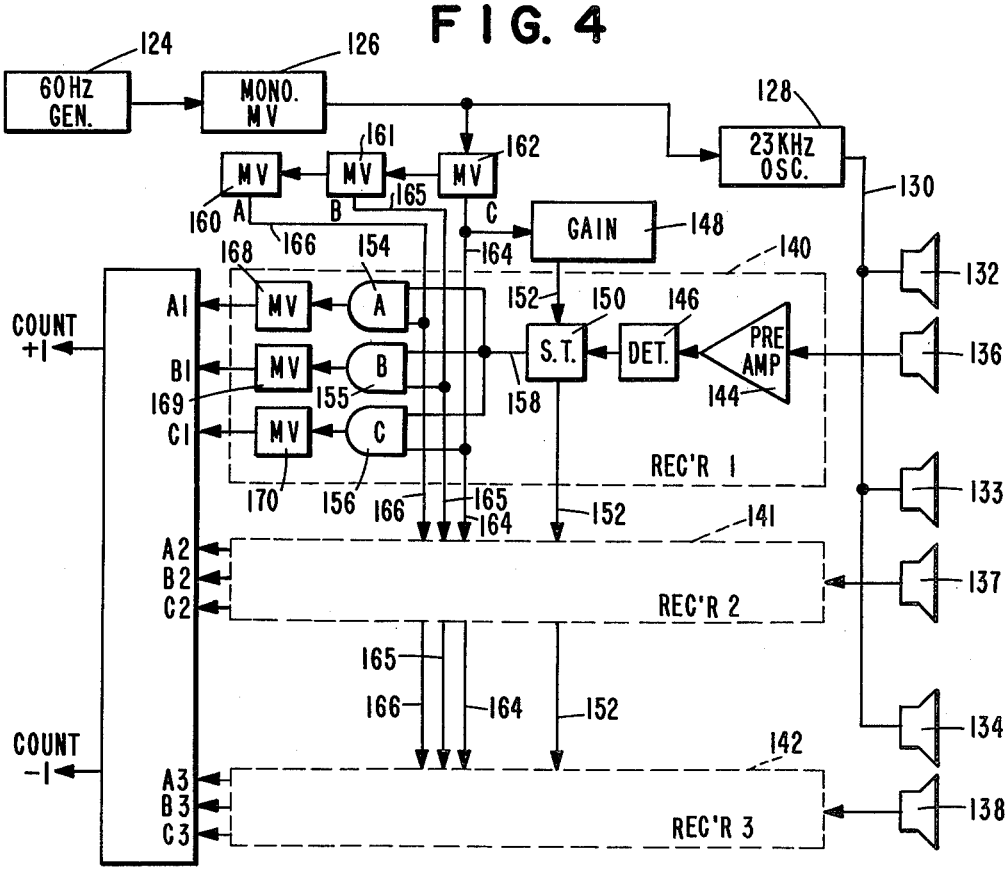
FIG. 4 is a block diagram of a foot detector system in accordance with the present invention.

The transmitter-receiver system which provides an accurate and reliable count of passengers by detecting the passenger's foot is illustrated in FIG. 4, to which reference is now made. Although this system employs the three-zone arrangement, the ranges, velocities and traffic problems of the targets are quite different than those encountered with the head counter, and thus the preferred system for this purpose is somewhat modified from the head counting system. Although the frequency domain processing of the head counting system may be used to define the signals from the three zones, it has been found that pulse amplitude modulation and time gating are more convenient. As shown in FIG. 4, the transmitter consists of three NE555 timer chips, the first of which operates as a 60Hz free-running multivibrator illustrated at 124. This oscillator is capacitively coupled to the second NE555 chip, which operates as a monostable multivibrator 126 producing a 0.5 millisecond pulse. The third timer is configured as a 23 kHz oscillator 128. This ensemble produces a half-millisecond burst of 23 kHz signal 60 times per second, and this signal is applied by way of a suitable matching network and transmitter output line 130 to a plurality of acoustic transducers 132, 133, 134.

The three transducers 132–134 are connected in parallel to the transmitter circuitry, and act together to provide coverage of the areas being monitored for entering and departing passengers. Because of the dimensions involved, two or three detector units generally will be used in a foot detecting system, with the transducers being spaced across of the width of the stairs to insure complete coverage of the area. For purposes of illustration, it is here assumed that three identical transmitter transducers are provided, with each transmitter having a corresponding receiver transducer, illustrated at 136, 137 and 138, which receives reflected acoustic signals.

The received signals are fed by each of the receiver transducers 136–138 to a corresponding one of three identical receiver networks generally indicated at 140, 141 and 142. As illustrated for receiver 140, each receiver network includes a preamplifier 144, a diode detector 146, a time-variable gain control 148 for range compensation, and a Schmidt trigger 150. The preamplifier consists of two stages of active RC operational amplifier and filter utilizing an MC1401C chip, while the Schmidt trigger employs a section of the MC1401C chip not used in the preamplifier. The time variable gain control circuit produces a ramp function which is fed by way of line 152 to the Schmidt trigger in each receiver, and establishes the threshold of operation for the trigger to provide range equalization in zones A and B (FIG. 3). Zone C is operated at maximum gain to "fatten" its polar pattern.

The output from the Schmidt trigger 150 is applied in parallel to three different AND gates 154, 155, 156 by way of line 158, and is gated through these gates at three different times. These times correspond to the round-trip transit times for acoustic signals reflected from targets in the three range zones A, B and C, respectively. The AND gates are enabled in the proper time sequence by means corresponding one-shot multivibrators 160, 161 and 162 which are clocked by the transmitter pulse from multivibrator 126, and which operate sequentially to enable their respective gates for the periods of time required to receive signals returned from targets within their corresponding range zones.

The C range gate 156 is enabled first by an output on line 164 from multivibrator 162, and remains enabled for the longest time period, since this is the close-in, wide zone. The output on line 164 is also applied to the generator 148 to initiate its ramp signal, and is applied to the corresponding AND gates of receivers 141 and 142. The B range gate 155 is then enabled by multivibrator 161 by way of line 165, and then the A gate 154 is enabled by its multivibrator 160 by way of line 166. Gates B and A are enabled for very short periods of time (e.g. on the order of 10 microseconds) because these represent narrow range zones. Receipt of a return signal from a target in one of the range zones during the time that the correpsonding gate is enabled results in an output from the gate which is fed to a corresponding one of three single-shot multivibrators 168, 169 and 170. The gate output signals activate these multivibrators to provide output pulses on lines A1, B1 or C1 representing the presence of targets within the range of receiver transducer 136 in zones A, B or C. Similarly, pulses on lines A2, B2 or C2 of receiver 141 represent target signals received by transducer 137, and pulses on lines A3, B3 and C3 represent target signals received by transducer 138 and processed by receiver. 142.

Figure 5:
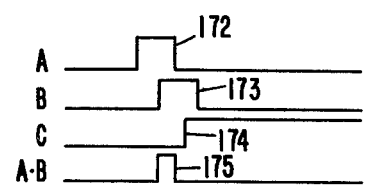
FIG. 5 is a timing diagram for the circuit of FIG. 4.

As may be seen in FIG. 5, a passenger entering a vehicle provided with the detector of FIG. 4 produces a series of return pulses illustrated at 172, 173 and 174. Pulse 172 is produced during the motion of the passenger's foot through zone A, while pulse 173 is produced during the movement through zone B. Since these two zones are relatively narrow, the corresponding pulses are short. Pulse 174 is produced in zone C, and is relatively long not only because zone C is large, but because the foot generally will come to rest in that zone as the passenger enters the vehicle. Pulse 175 represents the overlap between pulses A and B, and this overlap is utilized in the logic circuitry which distinguishes between entry and exit and provides the passenger count. This logic circuitry is illustrated in FIG. 6, to which reference is now made.

Figure 6:
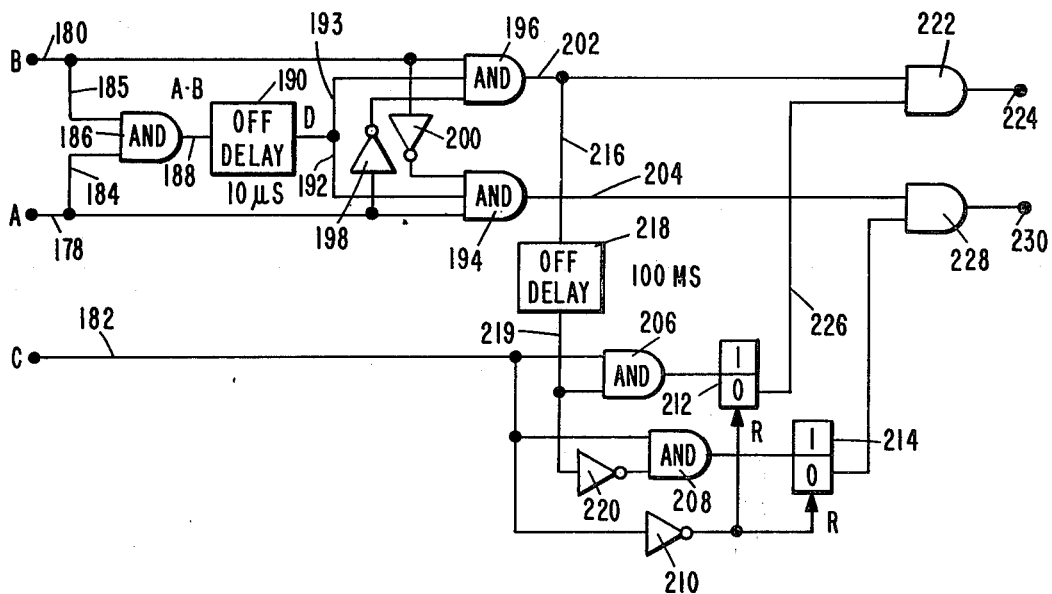
FIG. 6 is a block diagram of a logic circuit for use in the foot detector system of FIG. 4.

The logic circuitry of FIG. 6 receives the three pulses representing signal returns from zones A, B and C on lines 178, 180 and 182, respectively. The pulses on lines 178 and 189 are applied by way of lines 184 and 185 to the two inputs of an AND gate 186 which produces a signal on line 188 during the time that both A and B pulses are present. The signal on line 188 thus corresponds to the leading edge of the pulse 175 illustrated in FIG. 5, and indicates the concurrence, or overlap, of pulses A and B. Although FIG. 5 illustrates the sequence of pulses for an entering passenger, it will be understood that the sequence of pulses will be reversed for an exiting passenger, but that in both cases there will be an overlap of pulses A and B.

The logic circuit includes an "off delay" network 190 which receives the pulse on line 188 and produces a corresponding pulse D. The delay network holds pulse D on line 188 and for a period of, e.g., 10 microseconds after the end of the pulse on line 188, thereby producing at D a pulse of specified minimum width (pulse 175 in FIG. 5) which is fed by way of lines 192 and 193 an input for each of a pair of AND gates 194 and 196. The A pulse on line 178 is applied to a second input of AND gate 194 and by way of a trailing edge inverter 198 to a second input of gate 196. Similarly, the B pulse on line 180 is fed to a third input of gate 196 and by way of a trailing edge inverter 200 to a third input of gate 194.

The logic circuitry thus far described derives the overlapping pulse A·B, then at the trailing edge of this pulse looks to see which of the two inputs A and B is still present, thereby determining whether the passenger target is entering or leaving the vehicle. When a passenger is entering, an A pulse is provided first on line 178, but no output is provided by either gate 194 or 196, since there is not overlapping pulse D. When zone B is intercepted, a pulse is also provided on line 180, and gate 186 is activated to produce the D pulse on lines 192 and 193, However, gates 194 and 196 remain blocked because neither pulse A nor pulse B has ended, and thus neither $\overline{A}$ nor $\overline{B}$ is present at the inputs to gates 194 and 196. For an entering passenger, pulse A will end first, and when this occurs gate 196 will receive, for the 10 microsecond duration of delay network 190, pulses $\overline{A}$, B and D, and will be activated to produce a pulse on its output line 202. Similarly, for an exiting passenger pulse B will end first, providing at the input to gate 194 the signals A, $\overline{B}$ and D, activating that gate to provide an output pulse on line 204.

As the entering passenger's foot moves further onto the step, it enters the C zone, producing a C pulse on line 182. This pulse is fed to the parallel inputs of AND gates 206 and 208, and through a trailing edge inverter 210 to the reset inputs of flip-flop 212 and 214. The output pulse on line 202 (indicating an entering passenger) is applied by way of line 216 through an off delay network 218 and line 219 to the second input of gate 206, and further through a trailing edge inverter 220 to the second input of gate 208. The output pulse on line 202 is also applied to one input of an AND gate 222 which, when activated, produces an entering count on terminal 224.

When the passenger's foot reaches the C zone, then, the entering pulse on lines 202 and 219 and the C pulse on line 182 both are applied to gate 206 during the delay period of network 218, activating gate 206 to set flip-flop 212, thereby placing an inhibit signal from the flip-flop by way of line 226 to the second input of gate 222 and preventing any further count outputs from gate 222. At the end of C, $\overline{C}$ resets flip-flop 212 to permit the next count.

With an exiting passenger, a pulse C occurs first on line 182 and is applied to AND gate 208 along with the output of inverter 220 to activate gate 208 and set flip-flop 214. The set output of flip-flop 214 is applied to an output AND gate 228, which also receives the exit pulse on line 204, to inhibit gate 228 and prevent the appearance of an exit count pulse on terminal 230. As the passenger's foot leaves the step, pulse C ends and $\overline{C}$ resets flip-flop 214 to unblock gate 228. The exiting sequence of pulses B, B·A, and A then provides gate 194 with the required A, $\overline{B}$ and D inputs for 10 microseconds, and a down count is generated and applied through gate 228 to terminal 230.

Since the detectors of the present invention utilize integrated circuit chips and printed circuit boards, the units may be easily mounted in small, light-weight housings for easy fastening in suitable locations within buses or other vehicles. If desired, independent units may be secured at each entryway to the vehicle, and may use separate processors. If desired, time-sharing techniques may be used to enable a single data processor (logic) to cover two or more doorways. Because an acoustic detector of this type may be sensitive to acoustic interference, it may be desirable to provide an independent listening transducer which will respond to and cancel out such interference and prevent transient or spurious sounds from producing false counts. Although in a quiet area animals and perhaps some young people might be able to detect the 23 kHz carrier frequency used in the preferred embodiment disclosed herein, it is unlikely that they will be able to do so in the relatively noisy environment of an operating bus or other vehicle. If, however, such sounds should be considered objectionable, the carrier frequency could be shifted upward to about 40 kHz with negligible effect on the performance of the system.

Both the foot, or instep, and head counters described herein are designed to accommodate simultaneous passage of two persons over the same step in opposite directions, or in the same direction if their passage is not synchronous within a time resolution of a few milliseconds. Both accomplish this by sensing transient motions rather than presence and by arranging their zones of sensitivity so that two passengers cannot pass through the same zone at the same time. The instep counter uses a distributed transducer system to handle two passengers at once. The head counter uses a more remote single transducer pair and relies on lack of exact synchronism and a filtered, reconstitued doppler effect (paradoppler) to sort out passenger movements while ignoring moving targets outside the zones of interest.

Although the present invention has been described in terms of preferred embodiments, it will be apparent that various changes and modifications can be made without departing from the true spirit and scope thereof, as set forth in the following claims.

What is claimed is:

1. An automatic passenger counter for vehicles, comprising:

acoustic transmitter means including a frequency modulated oscillator and a first transducer, said transducer converting the output of said oscillator to acoustic waves for transmission;

acoustic receiver means for receiving acoustic waves returned from passengers entering and leaving the vehicle, said receiver means including a second transducer responsive to acoustic waves to produce corresponding output signals, and mixer means responsive to said second transducer output to produce range signals having frequencies proportional to the distances of targets from which transmitted acoustic signals are reflected to said receiver transducer;

limiting means restricting the response of said receiver to signals returned from defined range zones through which passengers enter and leave the vehicle, said limiting means including a zone filter for each range zone, each zone filter passing only those range signals which are reflected from targets in its corresponding zone;

circuit means responsive to each zone filter for converting range signals passing through the corresponding filter to output pulses having amplitudes proportional to the speed of motion of the target corresponding to the received range signal and having a polarity dependant on the direction of such motion; and logic means responsive to the sequence of said pulses to produce an enter or an exit count signal corresponding to each passenger entering or leaving said vehicle.

2. The passenger counter of claim 1, wherein said limiting means defines three range zones from which signals are returned and subsequently processed.

3. The passenger counter of claim 1 further including range compensator means for said range signals.

4. The passenger counter of claim 1, wherein said limiting means comprises first, second and third zone filters, each zone filter passing only range signals reflected from moving targets within its corresponding zone.

5. The passenger counter of claim 4, wherein said logic means includes means responsive to the polarity of the pulses from said circuit means to detect the direction of motion of a target through at least two of said three zones and thereby produce unambiguous exit or entry count signals, pulses corresponding to motion through said third zone inhibiting the production of said count signals to prevent duplicate counts.

6. An automatic passenger counter for vehicles, comprising:
    acoustic transmitter means for transmitting acoustic signals, said transmitter including pulse generator means and transducer means for generating and transmitting pulsed acoustic signals;
    acoustic receiver means for receiving acoustic signals returned from passengers entering and leaving the vehicle, said receiver means including transducer means for receiving and converting acoustic signals to corresponding electrical signals, detector means for said electrical signals, and trigger means for converting said received and detected signals to corresponding range pulses;
    limiting means restricting the response of said receiver to signals returned from defined range zones through which passengers enter and leave the vehicle, said limiting means comprising a plurality of zone gates connected in parallel to the output of said trigger means for receiving said range pulses, and timing means for enabling said gates sequentially and for selected time periods whereby each gate will pass range pulses received from targets within corresponding range zones;
    trigger means responsive to the outputs from said zone gates for producing pulses corresponding to the signals returned from said zones; and
    logic means responsive to the sequence of said pulses to produce an enter or an exit count signal corresponding to each passenger entering or leaving said vehicle.

7. The passenger counter of claim 6, wherein said limiting means comprises first, second, and third zone gates connected in parallel to the output of said trigger means, said timing means enabling said gates sequentially whereby each gate will pass range pulses received from targets within corresponding first, second, and third range zone.

8. The passenger counter of claim 7, wherein said logic means comprises a first gate for range pulses received from said first zone, a second gate for range pulses received from said second zone, a third gate producing an overlap output pulse during the time that pulses from said first and second zones overlap each other, means feeding said overlap pulse to said first and second gates, and means feeding the trailing edge of the pulse from said first zone to said second gate and feeding the trailing edge of the pulse from said second zone to said first gate, whereby either said first or said second gate is activated, depending on the sequence of range pulses received from said first and second zone, whereby an exit or entry count is provided.

9. The passenger counter of claim 8, wherein said logic means further includes means responsive to range pulses from said third zone to inhibit said exit and entry counts.

10. The passenger counter of claim 6, wherein said limiting means comprises at least first and second zone gates connected in parallel to the output of said trigger means, said timing means enabling said gates sequentially whereby each gate will pass range pulses received from targets within corresponding first and second range zones.

11. The passenger counter of claim 10, wherein said logic means comprises a first gate for range pulses received from said first zone, a second gate for range pulses received from said second zone, a third gate producing an overlap output pulse during the time that pulses from said first and second zones overlap each other, means feeding said overlap pulse to said first and second gates, and means feeding the trailing edge of the pulse from said first zone to said second gate and feeding the trailing edge of the pulse from said second zone to said first gate, whereby either said first or said second gate is activated, depending on the sequence of range pulses received from said first and second zone, whereby an exit or entry count is provided.

* * * * *